Figure 1:
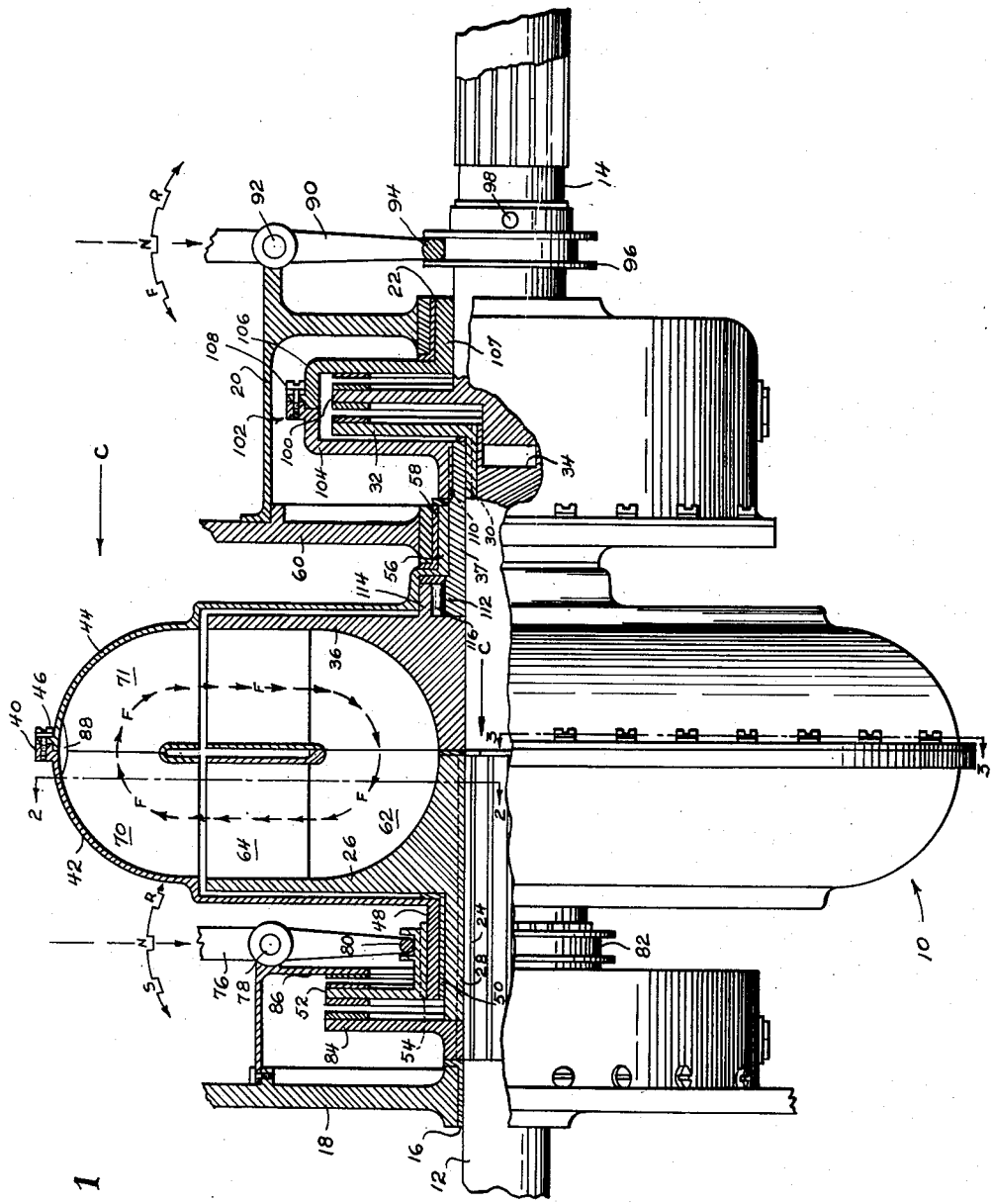

March 2, 1954     E. J. THURBER     2,670,823
TORQUE CONVERTER

Filed May 6, 1949            2 Sheets-Sheet 1

Inventor
Edward J. Thurber

By Scrivner Parker

ATTORNEYS

March 2, 1954 E. J. THURBER 2,670,823
TORQUE CONVERTER
Filed May 6, 1949 2 Sheets-Sheet 2

Inventor
Edward J. Thurber
By Scrivener & Parker
ATTORNEYS

Patented Mar. 2, 1954

2,670,823

UNITED STATES PATENT OFFICE 2,670,823

TORQUE CONVERTER

Edward J. Thurber, New Orleans, La., assignor to The Thurber Corporation, New Orleans, La., a corporation of Louisiana Application May 6, 1949, Serial No. 91,793

5 Claims. (Cl. 192—3.2)

This invention relates to hydraulic torque converters and more particularly to a variable speed fluid transmission of the type wherein the torque is multiplied and the power is transmitted through the cooperation between an impeller or drive member, a fluid guide member, a turbine or driven member, and the circulation of a working fluid in a closed path through such members.

In conventional hydraulic torque converters, the fluid exhausted from the impeller is delivered directly to the turbine from whence it flows through a stationary fluid guide member. This latter member functions to reverse the direction of flow of the working fluid and to deliver the same back to the impeller. Thus the fluid is caused to traverse a toroidal working path which interlinks the impeller, turbine and fluid guide members. Since however, the pattern of the fluid exhausted from the turbine varies in relation to the speed of rotation of the turbine, it has been found that a point is reached where such fluid pattern is not such that the fluid will pass smoothly and efficiently through the fixed profile of the blades or vanes of the fluid guide member. Such a variation in the flow of the fluid causes an overfeeding of the fluid guide member, an underfeeding of the impeller, and an undesirable turbulence in the fluid working circuit, which results in the generation of a considerable amount of heat and an appreciable loss in efficiency.

It is also customary in the hydraulic torque converters heretofore proposed, to position the fluid guide member in a rather restricted area located near the center of the fluid working circuit and closely adjacent the axis of the rotating members. With such an arrangement, the effective dissipation of the heat generated in the fluid is rendered exceedingly difficult. In addition, the fluid must reverse its direction of flow in a relatively small area, thus further contributing to the loss in efficiency through a partial blocking of the fluid circuit and a consequent generation of heat.

Accordingly, one of the principal objects of the present invention is to provide a hydraulic transmission of the torque converter type which is so constructed and arranged as to avoid the objections and disadvantages above set forth.

Another object is to provide a novel hydraulic torque converter wherein the fluid exhausted from the impeller is delivered directly to a stationary fluid guide member, the latter being so constituted that the reversal of the direction of the fluid flowing through the fluid guide member will take place in a relatively substantial area, in a gradual and smooth manner, and without the generation of excessive heat.

A further object is to provide in a torque converter of the above character, a novel construction wherein the stationary guide member, the turbine and the impeller all cooperate with the working fluid to cause the turbine to rotate in a direction opposite to that of the impeller, and to impart a directional flow characteristic to the fluid exhausted from the turbine and delivered to the impeller, which is the same as the direction of rotation of the impeller.

Another object resides in positioning the stationary guide member radially outwardly of the impeller and turbine elements, thus materially increasing the area in which the fluid flow is reversed and greatly simplifying the problem of the effective dissipation of any heat generated in the working fluid.

A further object is to provide a novel control for the guide member and casing therefor so that the guide member may be selectively allowed to freely rotate, to be driven with the impeller, or to be held in a stationary position.

Still another object relates to a novel arrangement for selectively withdrawing the working fluid from cooperation with the impeller and turbine members, thus effectively interrupting the transmission of torque between these members, such arrangement being also such as to permit the re-establishment of the working circuit at the will of the operator.

A still further object comprehends a novel torque converter assembly of the foregoing type wherein the casing and fluid guide member may be rotated manually when the parts are at rest, this construction materially facilitating the filling, draining, flushing and other servicing operations for the unit.

A further object is to provide a novel control for the torque converter which may be selectively operated for causing an output shaft associated with the converter to be rotated in one direction for reverse operation or the opposite direction for forward operation, such control being of such nature as to avoid the use of toothed gears or devices of a similar construction.

A still further object is to provide a fluid transmission and control of the above character which includes relatively few parts, the construction and arrangement thereof being such as to provide a compact and readily controllable structure, and one which functions at a relatively high efficiency.

Other objects and novel features of the invention will appear more fully hereinafter from a consideration of the following detailed description when taken in connection with the accompanying drawings illustrating one form of the invention. It is to be expressly understood however, that the drawings are utilized for purposes of illustration only and are not to be taken as a definition of the limits of the invention, reference being had for this purpose to the appended claims.

Figure 2:
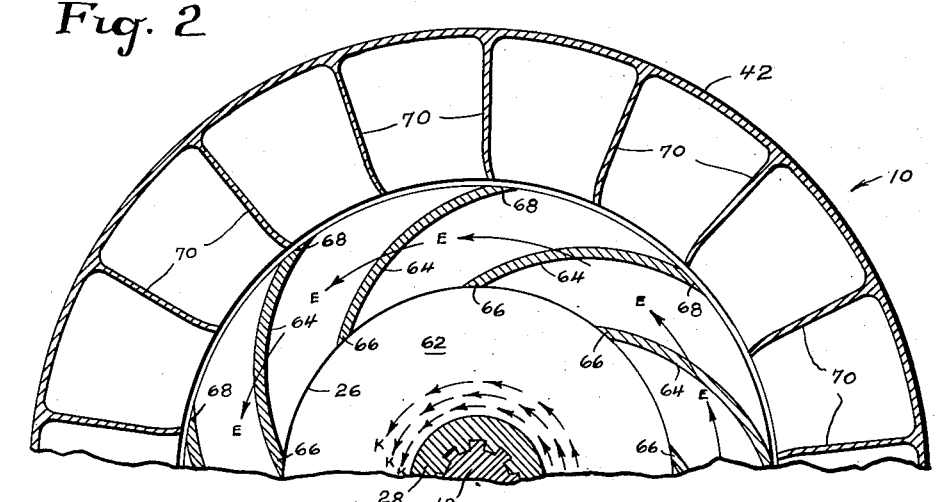
Figure 3:
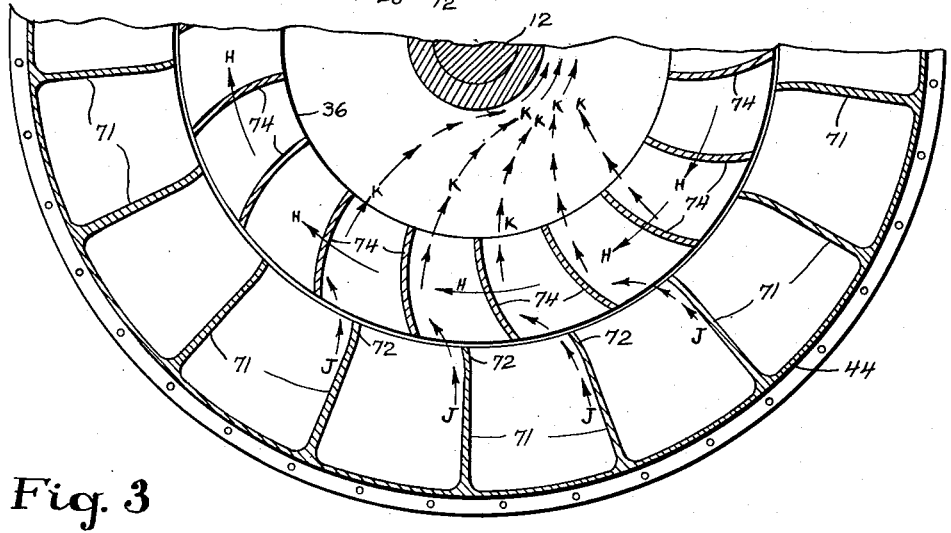

In the drawings, wherein similar reference characters refer to similar parts throughout the several views, Fig. 1 is a side view partly in section of a hydraulic power transmission device embodying the principles of the present invention;

Fig. 2 is a partial sectional view of the device taken substantially along line 2—2 of Fig. 1; and Fig. 3 is a view similar to Fig. 2 but taken substantially along line 3—3 of Fig. 1.

Referring more particularly to Fig. 1, the novel hydraulic transmission device of the present invention is illustrated therein as being of the torque converter type and includes a fluid unit 10 which is arranged to drivably connect driving and driven shafts 12 and 14, respectively, the driving shaft being rotatably supported by a front bearing 16 carried by a fixed casing section 18, and the driven shaft being mounted for rotation in a rear casing 20 as by means of a bearing 22. As shown, the driving shaft 12 is provided at its forward end with a plurality of splines 24 for driving an impeller member 26 through a sleeve 28. At its rear end, the driving shaft 12 is splined at 30 to a driving clutch member 32 and is hollow bored at 34 to slidably receive the forward end of the driven shaft 14, it being pointed out that the intermediate portion of said driving shaft 12 passes freely through the central bore of a turbine member 36 and a turbine driven sleeve 37.

One of the novel features of the present invention resides in the construction and arrangement of the fluid unit 10 which provides a simplified torque converter structure capable of operation in a highly efficient manner. More particularly, the fluid unit 10 includes the impeller and turbine members 26 and 36, respectively, together with a fluid guide member constituted by a housing or casing 40 for the reception and guidance of the working fluid, the casing being formed of a forward casing section 42 and a rear casing section 44, such casing sections being secured together as by a plurality of screws 46. At its forward end, the casing section 42 is formed with a sleeve 48 which is rotatably supported upon the impeller sleeve 28 by a bearing 50, a combined clutch and brake member 52 being slidably splined at 54 to the exterior of the sleeve 48 for a purpose which will appear more fully hereinafter. The rear casing section 44 is also provided with a sleeve 56 which extends between and is rotatably supported by the turbine driven sleeve 37 and a bearing 58 carried by a fixed partition 60 forming a part of the rear casing 20. It will be observed from the foregoing that the impeller and turbine members 26 and 36, respectively, are coaxially aligned and arranged side by side, while the periphery of the casing 40 constituting the fluid guide member, is positioned radially outwardly of the impeller and turbine members and surrounds the latter. Due to this construction, the fluid guide member provides a substantial area which not only facilitates the change of the direction of the flow of fluid, as the latter is exhausted from the impeller 26 and delivered to the turbine 36, but also enables the effective dissipation of the heat generated in the fluid during operation of the unit.

In order to provide for the efficient transfer of torque through the fluid unit 10, and referring to Figs. 2 and 3, the impeller is provided with an intake manifold 62 at its central portion and a plurality of curved vanes or blades 64 at its peripheral portion. As shown, such blades are angularly directed with respect to the radii of the impeller so that the inner ends 66 thereof are positioned in advance of the outer ends 68 thereof as respects the direction of rotation of the impeller as denoted by the arrows E. Such direction of rotation is counterclockwise when viewing the device from the direction indicated by the arrow C in Fig. 1. It will also be noted that the blades 64 are slightly curved in order to present a concave surface to the fluid as the latter flows radially outwardly from the manifold 62 during rotation of the impeller.

For the purpose of receiving the fluid from the impeller 26 and redirecting and delivering the fluid to the turbine 36, each of the casing sections 42 and 44 of the fluid guide member 40 are provided with spaced apart matched guide vanes or blades 70 and 71 of equal area, which are substantially radially directed as clearly shown in Figs. 2 and 3. However, the blades 71 of the rear section 44 of the fluid guide member are curved slightly in a direction opposite to the direction of rotation of the impeller, as indicated at 72 in Fig. 3. Due to this construction, as the fluid is exhausted from the blades 71 of the rear section 44, the direction of flow thereof will be clockwise as indicated by the arrows J of Fig. 3 and thus the turbine 36 will be caused to rotate in a direction opposite to that of the impeller.

A further important feature of the invention is to provide an arrangement whereby the direction of flow of the fluid exhausted from the turbine will be the same as the direction of rotation of the impeller. In this manner turbulence of the fluid and the excessive generation of heat will be avoided. Referring to Fig. 3, it will be observed that the fluid exhausted from the rear section 44 of the fluid guide member is directed in a clockwise direction and will strike the surfaces of a plurality of curved blades or vanes 74 formed at the peripheral portion of the turbine 36. As shown, the blades 74 are shaped in such a manner that as the fluid is exhausted from the turbine 36, it will flow to the impeller intake manifold 62 in a direction generally along the lines indicated by the arrows K, or in a counterclockwise direction. This direction of flow of the fluid is identical with the direction of rotation of the impeller. Hence, by the novel construction proposed, all abrupt changes in the direction of the flow of the fluid in the working circuit are avoided and a directional flow characteristic is imparted to the fluid as it is exhausted from the turbine which is similar to the direction of rotation of the impeller.

In addition to the foregoing, a further important feature of the invention resides in a novel construction for controlling the effectiveness of the fluid working circuit which, in normal operation during the transmission of torque, flows in a toroidal path interlinking the impeller 26, the fluid guide member 40 and the turbine 36, as denoted by the arrows F, Fig. 1. Such novel construction includes a selectively operable lever 76 which may be operated to one of three positions for rotating the fluid guide member 40 with the impeller 26, for locking the member 40 to a stationary part, or for allowing the member 40 to freely rotate. More particularly, and referring to Fig. 1, the lever 76 is pivotally mounted to the casing 18 through a pin 78 so as to be capable of selective movement to one of the three positions indicated at S, N or R. At its lower end 80, the lever 76 engages a yoke 82 which is connected with the clutch and brake member 52, which latter, it will be recalled, is slidably splined to the casing section 42 of the fluid guide member 40 so as to be rotatable with the latter. In the neutral position N, as shown, the member 52 is positioned intermediate a drive clutch 84, which is splined to the driving shaft, and a stationary brake member 86 which is connected with the casing 18. Under these conditions, and with the impeller 26 at rest, it will be readily seen that the fluid guide member 40 may be readily rotated by hand in order to facilitate the filling, draining, flushing or other servicing operations for the fluid unit 10.

In the event that the impeller 26 is rotating and it is desired to establish the fluid working circuit F for the transmission of torque, the control lever 76 is moved to the "stationary" or S position in order to bring the clutch and brake member 52 into frictional engagement with the stationary brake member 86. This action effectively locks the fluid guide member 40 in a stationary position to allow the flow of the working fluid in the manner heretofore described.

Should it be desired to interrupt the transmission of power through the fluid unit 10, at any time during operation, it is only necessary to move the lever 76 to the "rotate" or R position. When this movement is effected, the fluid guide member 40 will be rotated by the diving shaft 12 through the frictional engagement between the driving clutch 84 and the clutch and brake member 52. As soon as this occurs, all the fluid entering the periphery of the casing 40 in the area of the fluid guide blades 70 and 71 will, under the influence of centrifugal force be forced radially outward, and as long as the casing 40 is rotated there can be no radial inward flow of the fluid, and thus the fluid circuit is effectively interrupted. The above operation will occur in the event that the amount of liquid in the fluid unit 10 may all be received within the region of the guide member 40 defined by the blades 70 and 71, when the guide member is rotated. With the working fluid thus withheld from cooperation with the impeller and turbine members, it will be readily understood that the transmission of torque between such members is effectively interrupted. Due to this construction, the necessity of a separate disconnectible clutch between the driving and driven members of the transmission is avoided. It will be understood, that as soon as the control lever 76 is again moved to the "stationary" or S posiiton, the casing 40 will be held stationary and the fluid will automatically return to the impeller and turbine members so that the working circuit F may be reestablished and the transmission of torque resumed. Preferably suitably frictional facings are provided on the cooperable faces of the members 52, 84 and 86 in order to provide efficient clutching and braking actions. It is also preferred that the blades 70 and 71 of the fluid guide member 40 be cut away slightly to provide an annular passage or port 88 so that the fluid may be properly distributed in the fluid guide member 40 when the latter is rotated as above described.

Novel means are provided for selecting and controlling the direction of rotation of the driven shaft 14, so that the latter may be rotated for forward or reverse operation. In the form of the invention illustrated, such means includes a selecting lever 90 which is pivoted by a pin 92 to the stationary casing 20 so as to be capable of pivotal movement to any one of the positions indicated at N, R or F. At its lower end 94, the lever engages a yoke 96 which is secured to the driven shaft 14 through a pin 98, so that any pivotal movements of the lever will cause axial movements of the shaft 14.

In order to control the direction of rotation of the shaft 14 in accordance with axial movements thereof, the said shaft is provided with a clutch member 100 which, when the lever 90 occupies the "neutral" position N, is spaced slightly from the driving clutch 32 and a driving yoke 102. As shown, the latter includes forward and rear sections 104 and 106 which are connected together as by means of a plurality of screws 108. The rear section 106 is provided with a sleeve 107 which is interposed between the shaft 14 and the bearing 22. The forward section 104 is splined at 110 to the turbine sleeve 37, and the latter is driven from the turbine 36 through a one-way clutch of well known type comprising inner and outer rings 112 and 114 having a plurality of wedging rollers 116 disposed therebetween. With such an arrangement, it will be understood that as the turbine is rotated in the direction H, Fig. 3, under the influence of the working fluid, the outer ring 114 will cause the rollers 116 to become wedged against the inner ring 112 in order to establish a driving connection between the turbine 36 and the sleeve 37. On the other hand, should the sleeve 37 be connected with the driven shaft, and the latter tend to overrun the turbine 36, free wheeling of the driven shaft will result from the use of the one-way clutch. Moreover the one-way clutch will permit the turbine 36 to freely rotate in an opposite direction from that indicated by the arrows H of Fig. 3, in the event that the transmission of power is interrupted by moving the lever 76 to the position R as heretofore described. In such event, the impeller and the free running turbine both rotate in the same direction. It will be understood that suitable frictional facings are provided on the engaging surfaces of the members 32, 100 and 106, as shown.

From the above, it will be readily seen that with the fluid unit in operation, should the lever 90 be moved to the "forward" or F position, the clutch 100 will be moved into frictional engagement with the rear portion 106 of the yoke 102 in order to establish a forward drive connection between the turbine 36 and the driven shaft 14 by way of the one-way clutch 114, 116 and 112, the sleeve 37, the yoke 102 and the clutch member 100. Such forward drive will be constituted through the fluid unit 10. On the other hand should it be desired to establish a reverse or direct drive, the lever 90 is moved to the "reverse" or R position in order to connect the driven shaft 14 directly with the driving shaft 12 by way of the clutch members 100 and 32. In this case, the fluid unit 10 is shunted, and the drive is direct from the driving shaft 12 to the driven shaft 14.

It is to be pointed out that when desirable, the lever 76 at the forward end of the fluid unit 10 and the lever 90 at the rear end of the unit may be so connected that when the lever 90 is moved to connect the clutch 100 to the direct drive clutch 32 the lever 76 will be simultaneously or coincidentally operated to bring the clutch 52 into engagement with the driving clutch 84. It will be clear that during this operation, the casing 42 will be connected with the driving shaft 12 to be rotated thereby to thus stop the fluid from being circulated or agitated and at the same time, the driving shaft 12 will be directly connected with the driven shaft 14.

In operation, and assuming that the parts of the transmission are at rest with the levers 76 and 90 occupying the "neutral" or N positions, it will be understood that the fluid guide member 40 may be freely manually rotated for any required servicing operations. Hence a suitable quantity of working fluid in an amount required to establish the fluid circuit F, when the impeller 26 is rotating, may be poured into the member 40 through a filler plug, not shown, in order to condition the unit 10 for the transmission of torque. Thereafter the shaft 12 is rotated by any suitable means, such as the power plant on an automotive vehicle.

In order to place the fluid unit 10 in operation, it is only necessary to move the lever 76 to the S position in order to hold the fluid guide member 40 stationary through the cooperation between the brake and clutch member 52 and the brake member 86. Thereupon the toroidal path of the fluid working circuit F is established and the turbine 36 will be rotated in a direction opposite to the direction of rotation of the impeller 26, it being noted from Figs. 2 and 3 that the impeller member 26 rotates in the direction of the arrows E while the turbine 36 rotates in the opposite direction as shown by the arrows H.

With the parts in such condition, the shifting lever 90 may be operated to select the desired direction of rotation of the driven shaft 14. For example, in the event that it is desired to rotate the driven shaft 14 in the same direction as the turbine 36, the lever 90 will be moved to the position F which, through the shifting of the yoke 96, shaft 14 and clutch member 100 to the right, as viewed in Fig. 1, will establish a driving connection with the turbine 36 by way of the one-way clutch connection 114, 116 and 112, the turbine driven sleeve 37, the yoke 104, and the clutch member 100 secured to the driven shaft 14. Under these conditions, the shaft 14 will be directly driven in the same direction as the direction of rotation of the turbine 36 and the drive will include all of the members of the fluid unit 10.

On the other hand, should it be desired to rotate the driven shaft 14 in the opposite direction, it is only necessary to move the shifting lever 90 to the position R in order to bring the clutch member 100 into direct frictional engagement with the driving clutch 32. Due to this operation, it will be readily understood that the driving and driven shafts are directly connected together independently of the fluid unit 10, by way of the driving clutch 32 and the clutch member 100 which is secured or otherwise connected with the driven shaft.

It will be noted from the above that the control of the direction of rotation of the driven shaft 14 is effected by a simple manipulation of the shifting lever 90 and without the necessity of employing toothed gears or their equivalents. Such an arrangement avoids all clashing of gears and materially simplifies the control of the transmission.

Following the setting of the levers 76 and 90 in the respective positions S and F, the transmission functions to multiply and transmit torque from the driving shaft 12 to the driven shaft 14. Thus as the impeller 26 is caused to rotate in the direction E of Fig. 2, the fluid circuit F interlinking the impeller 26, the fluid guide member 40, and the turbine 36 will be established and maintained. During the operation of the fluid unit, the blades 64 of the impeller will cause the fluid to be withdrawn from the intake manifold 62 and to flow radially outwardly where it is received by the blades of the fluid guide member 40. While passing through the blades 70 and 71, the direction of the fluid will be reversed and the fluid will thereafter be delivered to the bladed turbine 36 along the paths J, Fig. 3, such paths being directed in the manner illustrated, by reason of the curved inner ends 72 of the blades 71. Thus the fluid leaving the blades 71 of the fluid guide member 40 will be flowing in a clockwise direction, as viewed in Fig. 3, and will cause the turbine to rotate in a similar direction which is opposite to the direction of rotation of the impeller.

The fluid, in passing through the blades 74 of the turbine, will follow the contour of these blades and will be exhausted in a direction indicated by the arrows K, Fig. 3. Such direction of flow is the same as the direction of rotation of the impeller and hence all overcrowding or underfeeding of the latter is avoided.

When it is desired to interrupt the transmission of power through the fluid unit 10 and thereby declutch the driving and driven shafts, the selecting lever 76 is moved to the R position in order to connect the fluid guide member 40 directly with the driving shaft 12 through the driving clutch 84 and the clutch and brake member 52. As soon as this occurs, and the fluid guide member 40 is rotated, the fluid will flow into the bladed area of the guide member under the influence of centrifugal force, and will remain there during continued rotation of the guide member. Thus, as soon as the turbine is deprived of fluid, a declutching action is secured, and the turbine will be free to rotate in a counterclockwise direction, as viewed in Fig. 3, this action being possible due to the provision of the one-way clutch connection 114, 116 and 112.

From the foregoing, it will be observed that when the amount of fluid in the fluid unit 10 is such that all of it may be received within the area defined by the blades 70 and 71, the transmission of torque between the driving and driven shafts may be interrupted by rotating the guide member. Interruption of the torque may also be effected in the event that the guide member 40 contains an amount of fluid in excess of that which may be accommodated by the area defined by the blades 70 and 71. In such latter event, when the guide member 40 is rotated, the turbine 36 will be free to rotate in the same direction as the impeller 26, due to the releasing action of the one-way clutch 112, 114 and 116.

It will be understood that the resumption of the transmission of power may be readily effected by merely moving the selecting lever 76 back to the S position in order to render the fluid guide member stationary. When this occurs, the fluid is returned to the impeller and turbine members and the fluid working circuit F is re-established.

The present invention thus provides a novel hydraulic power transmission of the torque converter type which includes a highly desirable construction of impeller, turbine and fluid guide members, positioned, shaped and arranged to avoid any underfeeding or crowding of such members during the operation of the fluid working circuit. In addition, the provision of the control for the fluid guide member secures a simplified arrangement for either maintaining the guide member stationary for power transmission, or for rotating the same to provide an effective control of the fluid working circuit for declutching. A further feature resides in the selective control of the output of the transmission unit which is arranged to secure rotation of the output shaft in either direction without the use of toothed gears or their equivalents.

It will be readily understood that while one embodiment of the invention has been shown and described herein, various modifications may be resorted to without departing from the spirit of the invention. For example, instead of a radial flow of the fluid from the impeller and to the turbine by way of the fluid guide member, it is contemplated that such a flow may be lateral if desired. Those skilled in the art will perceive various other modifications and changes without departing from the essence of the invention. Reference will therefore be had to the appended claims for a definition of the limits of the invention.

What is claimed is:

1. A fluid power transmission mechanism comprising a single rotatable casing containing a working fluid, a driving shaft, an intermediate shaft, a driven shaft, means for rotatably mounting said casing with respect to said shafts, said casing having a plurality of circumferentially arranged and spaced apart fluid guide vanes occupying the area of the periphery of the casing, said fluid guide vanes having an equal area on each side of a center line arranged transverse to the axis of rotation of the casing and which divides the casing into two similar parts, clutch and brake means for respectively selectively connecting the casing to said driving shaft for rotation thereby or to a stationary part to hold the casing stationary, an impeller in said casing, means for connecting the impeller to said driving shaft for rotation thereby to circulate the fluid in the casing, a single turbine element having a single turbine wheel fixed against axial movement in said casing and positioned in the path of the circulating fluid to be rotated thereby, said fluid guide vanes being positioned in the path of the circulating fluid between the impeller and the turbine wheel and arranged to reverse the direction of fluid flow, said turbine wheel having a plurality of vanes positioned and arranged to cause the turbine wheel to rotate oppositely to the direction of rotation of the impeller when the fluid is flowing therethrough, means including a one-way clutch connecting said turbine wheel and said intermediate shaft to transmit torque to the latter when the turbine wheel is under the influence of the circulating fluid and allowing the turbine wheel to freely rotate in the same direction of rotation as the impeller when the casing is rotated, and means for connecting the intermediate and driven shafts.

2. A fluid power transmission mechanism as set forth in claim 1 wherein the circulation of fluid in the casing by the impeller moves radially outwardly from the impeller into and through the fluid guide vanes where the fluid is turned radially inwardly to flow into and through the turbine wheel, the turbine wheel vanes being directed to cause the fluid which is exhausted therefrom to flow in the same direction as the direction of rotation of the impeller.

3. A fluid power transmission mechanism as set forth in claim 1 which includes in addition, means for connecting the driven shaft with the driving shaft.

4. A fluid power transmission mechanism as set forth in claim 3 which includes in addition, means operable to selectively connect the casing with the driving shaft for rotation therewith when the driving and driven shafts are connected.

5. A fluid power transmission mechanism as set forth in claim 1 which includes in addition, a shiftable clutch movable in one direction to connect the driven shaft with the intermediate shaft to rotate the driven shaft in one direction, and movable in the other direction to connect the driven shaft with the driving shaft to rotate the driven shaft in the opposite direction.

EDWARD J. THURBER.

References Cited in the file of this patent

UNITED STATES PATENTS

| Number | Name | Date |
|---|---|---|
| 1,298,990 | Mason | Apr. 1, 1919 |
| 1,953,458 | Bauer | Apr. 3, 1934 |
| 1,960,705 | Kochling | May 29, 1934 |
| 2,004,279 | Fottinger | June 11, 1935 |
| 2,015,212 | Beaumont | Sept. 24, 1935 |
| 2,084,312 | Astafiev | June 22, 1937 |
| 2,152,113 | Van Lammeren | Mar. 28, 1939 |
| 2,170,649 | Banker | Aug. 22, 1939 |
| 2,205,794 | Jandasek | June 25, 1940 |
| 2,235,418 | Buchhart | Mar. 18, 1941 |
| 2,258,684 | Lysholm et al. | Oct. 14, 1941 |
| 2,289,019 | Jessen | July 7, 1942 |
| 2,381,682 | Mayner | Aug. 7, 1945 |
| 2,442,840 | Carnagua | June 8, 1948 |
| 2,465,739 | McGill | Mar. 29, 1949 |